June 23, 1964    D. F. OTHMER ETAL    3,137,995
ABLATION RESISTANT REACTION PROPULSION NOZZLE
Filed Jan. 26, 1960
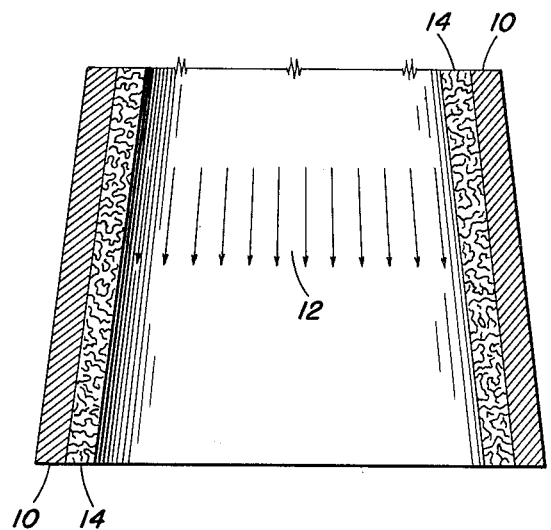
INVENTORS
Donald F. Othmer
Walter Brenner
BY Charles J. Elderkin
ATTORNEY

United States Patent Office 3,137,995
Patented June 23, 1964

3,137,995
ABLATION RESISTANT REACTION
PROPULSION NOZZLE
Donald F. Othmer, Coudersport, Pa. (333 Jay St., Brooklyn, N.Y.), and Walter Brenner, Flushing, N.Y. (% Chemical Engineering Dept., New York University, University Heights, New York 36, N.Y.)
Filed Jan. 26, 1960, Ser. No. 4,600
6 Claims. (Cl. 60—35.6)

This invention relates to methods for manufacturing articles for use in contact with high-velocity gas streams and to the resulting products.

In many fields of technology, it is now common for articles and devices to be subjected to direct contact with gas streams characterized by great velocity and high temperatures. A particular example is the nozzle or orifice element of a rocket or jet engine, the surface of which is subjected to the high-velocity, high-temperature combustion gases escaping from the combustion zone of the engine. As is now well recognized in these fields, the general effect of such a high-velocity, high-tempered gas stream is a tendency to melt and erode the surfaces over which it flows in direct contact; this adverse result arising by combined reason of the high-temperature gases forming the stream, frictional heat resulting from the high-velocity of the gas stream, and the abrasive action exerted by small solid or liquid particles suspended in the gas stream. The latter particles may exist as a result of incompletely combusted fuel, or as the residue from such combustion. In addition, such surfaces are often corroded because of the adverse chemical nature of the gas stream, per se. These combined effects produce an end-effect which is generally referred to as ablation, i.e., the removal or attrition of solid matter from any given surface.

The one obvious consequence of ablation is that the surfaces and elements so affected become dimensionally unstable during use. Such dimensional instability is particularly undesirable in the case of nozzles and the like employed to define the outlet orifice for combustion gases in missiles, rockets and similar devices. Obviously, dimensional changes of such devices affect the velocity of the escaping gas, the pressure within the combustion chamber, the direction of thrust of the escaping gas, and other variables. Another consequence of ablation is a mechanical weakening of the structure due to (1) loss of solid matter, and (2) increase in temperatures. This weakening may eventually bring about major mechanical failure of the structure as a whole.

A further problem encountered in structures subjected to the actions of these gas streams arises by reason of the fact that the gas streams change in temperature with extreme rapidity. Such abrupt and frequent temperature changes tend to cause spalling or breakage of the structures due to thermal shock.

While considerable attention has been given to these problems, there has been, to our knowledge, no satisfactory solution yet proposed. In particular, there has been no method evolved for constructing a nozzle or like article which is characterized both by resistance to ablation and resistance to thermal shock. For example, many high-melting point alloys, ceramic materials, so-called cermet materials and the like have been proposed for use in fabricating articles of the general class described, but it is found that the structures formed of these special materials of construction, while resistant to ablation, are generally not satisfactorily capable of withstanding the severe thermal shock encountered in actual use of the articles.

A general object of the present invention is to provide a method for producing articles of the type described which can be employed successfully in contact with high-velocity, high-temperature gas streams.

Another object is to provide articles of manufacture capable of resisting both ablation and thermal shock when exposed to gas stream of high-velocity and high-temperature.

A still further object of the invention is the provision of a novel method for producing articles of the type described which are self-compensating in the sense that, upon exposure to a hot, high-velocity gas stream, the article will automatically maintain a predetermined maximum surface temperature. This unique thermal compensating action permits the retention of adequate physical strength, etc., at a predetermined level calculated to maintain the article within safe fatigue limits during normal use.

The foregoing as well as other features and objects of our invention are illustrated in the accompanying drawing and are attained by forming at least the surface portion of the article in question in the form of a porous mass, the pores, voids or interstices of which retain a heat-absorbing material or coolant capable of volatilizing or subliming at the temperatures encountered when the surface of the article is subjected to contact with a high-velocity, high-temperature gas stream. As illustrated in the drawing, which diagrammatically represents a rocket nozzle according to the invention, a supporting structure or shell 10 is used to guide the gas stream 12 from the rocket motor; the material of the invention is represented at 14 and comprises a porous body manufactured in the manner hereinafter described, with a sublimable or volatilizable solid material filling said pores. Thus, heat is effectively removed from the critical surfaces of the article by reason of the latent heat of melting and the high latent heat of vaporization or sublimation necessary to convert some or all of the material disposed in the pores or interstices of the article to the vapor state, and because of the very high sensible heat necessary to raise the temperature of that material to a value at which vaporization or sublimation occurs. Furthermore, the preferred heat-absorbing materials utilized in the practice of our invention may undergo an endothermic chemical reaction or dissociation which may represent a much greater heat absorption than either the sensible heat or latent heat.

The cooling phenomenon of the invention may be likened to the exposure of a porous cloth wet with water in a gas stream considerably above the temperature at which the cloth would normally decompose if dry. Under such conditions, however, the cloth may survive for some moments or until the water is all evaporated. By rendering one side of the cloth impervious, all of the water vapor must pass out the other side which may be likened to the critical or hot surface, by way of analogy, of a physical structure subject to ablation.

In accordance with one embodiment of our invention, the porous article, or the porous surface portion of the article, as the case may be, is formed by conventional powder metallurgical techniques, such as compression molding of metallic particles into an adhering mass. Similarly, metallic particles can be mixed with a filler material, the mixture then molded to the desired shape, and the filler evacuated or removed by thermal or other means. The resulting voids are then partially or completely filled with the coolant material which vaporizes or sublimes to effect cooling of the article. Alternatively, in lieu of using any of the conventional fillers now employed in such powder metallurgical procedures, the material provided for vaporization or sublimation during actual use of the article can be employed in the first instance as the filler, being initially combined uniformly with the metallic particles before compression molding of the mass.

Advantageously, however, the porous article is fabricated by pressure molding of a metallic mesh material.

Thus, the method may employ as a starting material any loosely-knitted, woven or otherwise fabricated mesh of fine metallic filaments, such as, e.g., wires of round or rectangular cross-section or, indeed, thin ribbons. The mesh material is tightly packed, by hand or mechanical means, into a suitably formed mold cavity and is then compressed to final form by a plunger or other suitable means, the molding pressure, the initial nature of the mesh, and the amount of mesh employed being so controlled as to provide a finished porous article in which the filaments are interengaged to create pores or interstices which amount to 10–80%, and advantageously 50–80%, of the total volume of the article.

Whether the porous mass forming the body of the surface of the article is formed from a mesh material, as just described, or from discreet particles in accordance with conventional powder metallurgical procedures, the voids or interstices thereof are subsequently partially or completely filled with the coolant material which is to vaporize or sublime, i.e., when the finished article is subjected to the high-velocity gas stream, assuming, of course, that such material has not been incorporated during the forming operation in the manner described hereinbefore. Thus, in effect, the porous mass is impregnated with the coolant. This can be accomplished in a number of different ways, such as by employing the coolant in a fluid state and forcing the same into the pores, voids or interstices of the formed mass under suitable pressure. Another method is, of course, the impregnation of the porous mass by an impregnant which under the specifically employed impregnating conditions is in the liquid or gaseous state. A simple method is thus a casting under suitable conditions to fill completely the voids.

The material from which the porous body or surface portion of the article is fabricated can be iron, nickel, chrome-iron, chrome-nickel, various iron alloys, carbide alloys, Nichrome alloys or more difficulty processed metals such as tungsten, molybdenum, tantalum, and the like. In general, the present invention makes possible the use of the more easily fabricated metals and alloys, due to the fact that vaporization or sublimation of the filler material, during use of the article, satisfactorily minimizes the temperature of the surface in contact with the hot gas stream. It will be understood, however, that under extreme conditions it may prove desirable to employ the higher melting point, more expensive and more difficultly fabricated metals and alloys in making the articles in question or a surface element thereof.

In forming the surface, or indeed a major part of any porous body, the balance of the body or a non-porous liner or shell may be used as a form or mold in molding the mesh or other porous-forming material to any desired configuration. Thus, a metal shell may be used as a liner for the mold into which is forced the mass of filaments to give the desired porous surface or body structure, such that upon removing the composite structure from the mold the porous mass will be supported by the preformed metal shell. This composite unit may then be fitted as an assembly into the enclosing structure as a whole to provide the desired porous surface at the critical interfaces in contact with a gas stream and an impervious backing which functions to concentrate the cooling action at these critical surfaces.

In some instances it may prove desirable to employ ceramic structures with continuous pores provided throughout the ceramic mas. Here the pores are impregnated in the same way; and essentially the same type of cooling is effected. The mechanical design of these ceramic fabrications will usually require complete enclosure of the article in an impervious, strong metal backing structure, since the unsupported mass may crack or break under thermal stress in service. However, the adhesive bonding action of the heat absorbing material will generally serve to prevent or mitigate against total rupture and disintegration of the structures under these conditions.

As the material utilizable for the vaporizable or sublimable coolant, we can employ any suitable substance having a satisfactorily high latent heat of vaporization or sublimation coupled, advantageously, with the characteristic of highly endothermic dissociation or decomposition within the range of temperatures encountered in actual use of the article in question. In general, the elements of lowest atomic weight within groups I–A, II–A and III–A of the periodic table, as well as magnesium and calcium from group II–A, and the hydrides of these metals may be employed as the coolant material. Specifically, the coolant may be any of lithium, lithium hydride, beryllium, beryllium hydride, magnesium, magnesium hydride, calcium, calcium hydride or boron, or combinations of these materials. These elements and compounds have among the highest latent and specific heats of known materials, and, hence, are considered preferred coolants from the standpoint of our invention.

From among the above general materials, we find lithium and lithium hydride to be particularly suitable for use as coolants since both possess particularly high heats of fusion, high heats of vaporization, high heats of decomposition, high specific heats, and desirable vapor pressures. Thus, lithium metal has a latent heat of vaporization of 5800 calories per gram at its boiling point (1200° C.) as compared to 540 for water at its boiling point. (Water is much higher than any other usual liquid, but is less than $\frac{1}{10}$ that of lithium). In addition, lithium has the highest specific heat of any element, and this property is especially pronounced at the temperature range involved in the use of the unique articles of our invention. With regard to the characteristics of high vapor pressure, it will be understood that the gas stream with which the article is to come into contact in use may be considerably above atmospheric pressure, particularly in the case of a rocket nozzle or the like, wherein the combustion gases are discharged through the nozzle under high thrust conditions.

The hydrides of the metals of groups IA and IIA of the periodic table are also particularly suited for use as coolants in the practice of our invention, inasmuch as they possess the characteristic of decomposing endothermically at the high temperatures involved; this endothermic decomposition mechanism resulting in absorption of additional heat. Lithium hydride is accordingly an especially useful coolant material for use in the invention.

The vaporization temperature of the coolant employed to impregnate the porous article (under the pressures prevailing in its use) determines the maximum surface temperature of the article in use. Above the vaporization temperature, heat is absorbed merely to vaporize the coolant. The coolant thus escapes in gaseous condition at the surface and acts as a thermal insulator, further minimizing temperature rise at the surface of the article. In general, coolants with lower vaporization temperatures will provide a lower surface temperature, so long as there is a sufficient supply of the coolant available for vaporization. It is thus apparent that, assuming a sufficient supply of the coolant is present for vaporization throughout the period during which the surface of the article is contacted by the gas stream, the article may be fabricated of a metal having a melting point substantially below the temperature of the gas stream. In the use of a coolant such as metallic lithium, which has a much higher thermal conductivity than any metal which would be used as the porous surrounding structure, heat will be conducted in from the surface more efficiently through the coolant, and will cause it to vaporize just below the critical surface, thereby effectively cooling this surface from the most efficient point possible.

In general, the temperature of the gas stream to which the article can be safely subjected increases as the percentage of voids or interstices of the porous article increases, since the larger the amount of coolant carried by the porous structure, the greater will be the cooling effect.

Of course, the tendency for erosion, after vaporization or sublimation of the coolant from the void or interstices, also increases as the amount of free space for the coolant is increased. This occurs because the coolant is comparatively soft. A desirable balance may be struck in proportioning the amount of porosity and, hence, coolant present, whereby the latter is increased if the major hazard is high temperatures; whereas the amount of metal is increased (lesser voids) if erosion is the main hazard. Even if slight ablation occurs, however, because of the presence of a relatively large proportion of the coolant at the exposed surface of the article, this is offset and minimized because the rate of heat transfer, i.e., from the surface inwardly into the article, increases as the coolant is vaporized, thus causing a slight increase in the interior temperature of the article and promoting further vaporization or sublimation of the coolant to secure the desired result of preserving the surface without further severe ablation. This ablation then sets up a self-compensating mechanism which serves to preserve the geometric contour, since the faster any given part of the surface tends to ablate, the more will be the compensation effect at that point due to increased vaporization of the coolant.

The technique of forming the porous body by compressing a metallic mesh material into a desired shape has the particular advantage of allowing the use of more brittle metal than is possible when other forming methods are employed, e.g., casting and machining. Considering a completed porous article formed in this manner, it will be understood that the filaments of metal still exist in their fine state. In this form, the brittle material loses its tendency to be damaged by cracking or spalling due to thermal shock since the heating of the fine filaments does not produce such severe thermal strains as occur in the case of larger bodies of the same metal. Indeed, even those metals which are normally most brittle under thermal strains, are unaffected by such strains when in the form of wire. In addition, considering that the porous body contains an amount of voids or interstices equal to as much as 80% of the total volume of the article, the brittle metal or other material forming the porous body is actually reinforced by the filling material provided to act as a coolant.

From the foregoing, it will also be apparent that the finished article, when formed by compressing a metallic material in wire or fine ribbon form, is of relatively light weight as compared to an article of corresponding size and shape produced, for example, by powder metallurgical procedures. Again considering the fact that upwards of 80% or even more of the total volume of the article may be made up by the voids or interstices, and that the coolant can have a specific gravity less than 1, it will be obvious that the completed article can be far lighter, despite its high resistance to ablation and thermal shock, than is true with solid structures and materials of the types heretofore in use by industry. It is obvious that, since molding of the material from a wire or ribbon mesh involves the use of less metal than is true in the case of other forming procedures, a considerable saving in cost can be achieved when one employs the highly refractory metals, which are also so very expensive.

In accordance with a particularly advantageous embodiment of the invention, the article can be formed by initially molding under pressure a mesh loosely-knitted from fine tungsten wire, the size of the wire, the knitting procedure, the amount of mesh employed, and the molding pressure being controlled to provide a finished article comprising 10–80% voids, and preferably 50–80% voids. The porous article removed from the mold is impregnated with lithium hydride as the coolant, so that on a volume basis, 50% or more of the article consists of the lithium hydride which solidifies after the impregnation.

The invention is particularly applicable to the manufacture of discharge nozzles for solid propellant rockets. In such cases, it has been found that the desired life of one minute or more during which burnout of the propellant normally occurs can be satisfactorily achieved without undue dimensional change of the nozzle. Such a nozzle, when formed in accordance with the invention, has a relatively smooth surface, thus minimizing friction and loss of thrust energy. In this connection, when the body of the nozzle is formed by molding mesh material, and impregnating the molded mass with a molten coolant, the surface of the article is satisfactorily smooth after cooling and removing from the mold, and no machining or similar finishing operation is required.

In the application of the invention to the production of discharge nozzles for rocket engines, it is helpful to employ as the vaporizable or sublimable coolant material one which materially increases the volume of the gas stream passing through the nozzle. Thus, by using a coolant such as lithium hydride, the volume of the escaping gas stream is increased both because of the greater number of molecules present in the stream due to vaporization of the coolant, and because of the higher temperature of the gas stream resulting from the emission of heat contained in the vaporized coolant. By reason of this increase in volume of the gas stream emitted from the nozzle, the thrust attained is correspondingly increased.

The invention finds particular application to articles, such as discharge nozzles for certain types of solid propellant rockets, exposed to a gas stream which constitutes a reducing atmosphere. However, the invention is also useful in connection with articles exposed to an oxidizing gas stream such as those provided by certain other known propellant charges. Thus, a rocket nozzle can be provided in accordance with the invention wherein the vaporizable or sublimable material is of such nature as to yield, upon combustion with the oxidizing gas stream, a greater volume of gas and hence a greater discharge velocity from the nozzle. Also, in the production of nose cones or forward extending tubes or probes for rockets, the technique of our invention provides shapes which are highly resistant to the ablation normally caused by the high temperatures due to high velocity and skin friction with the atmosphere on re-entry. In these structures, back-up shells may be required to obtain impervious overall structures, and suitable materials for this purpose range from graphite and copper to fiber reinforced plastics and ceramics, e.g., silicon carbide.

It is believed that our invention may be best understood by reference to the following specific examples illustrating the application of the foregoing principles and procedures to the production of typical ablation-resistant articles of the invention.

*Example I*

A tantalum stocking is woven from thin gage tantalum wire in the tubular shape (3″ diameter). A predetermined length is then cut-off and is hot-shaped against a suitable metallic mandrel by pressure (1–10 tons/sq. inch) to give a compacted shape of approximately 50% porosity in the general shape of a rocket nozzle. Lithium hydride is then impregnated at 680° C. in the liquid state under inert nitrogen as a protective atmosphere to fill the interstices of the compacted shape by positive pressure application. The structure so impregnated is then used for a solid propellant charge as a nozzle after backing with a thin tantalum shell to render the composite structure impervious and rigid.

*Example II*

The procedure of Example I was repeated with a tungsten-tantalum alloy wire containing 15 percent by weight tungsten. The structure was hot-shaped and pressed (over 1 ton/sq. inch) to yield a nozzle configuration. The mold was first lined with thin sheet tantalum to provide a composite structure of impervious outer coating. Lithium metal was impressed into the interstices of the porous mass to provide an overall mass containing approximately 75% by volume of lithium.

*Example III*

The procedure of Example I was repeated with a molybdenum wire containing essentially pure metal to provide a nose cone shape measuring 12 inches in diameter by 8 inches in length and containing approximately 40% by volume of molybdenum. The remaining 60% of the structure was impregnated with boron metal.

*Example IV*

A ⅛ inch stainless steel wire stocking was knit in a tubular shape 8 inches in diameter and then compressed in a mold to a nozzle configuration under 30 tons/sq. inch pressure to provide a composite structure of approximately 30% by volume of metal. This structure was then impregnated or cast with molten beryllium hydride.

Still another method of producing porous bodies capable of then being impregnated with the thermodynamic cooling agent, consists of the lamination of a multiple number of meshes or screen sheets having suitable size openings. These sheets may be compressed and caused to adhere by a sufficiently high pressure, then bound together if desired or necessary by other intermingling of wires before being impregnated. They may also be pressed under temperatures sufficiently high to promote fusion at the surface but not sufficiently high to cause an entire melting. Such fusion may be occasioned by the use of brazing alloys and brazed structures or may be accomplished by using alloys of metals of varying melting points. (This same semi-fusion of metal wires, etc., may be used also in other embodiments above.)

Such use of laminations of screens may be particularly advantageous in forming the final shaped object. Thus, for example, a jet nozzle, which would usually be a solid bounded by surfaces formed by the rotation of curved elements could be made up by stamping of numbers of rings of different sizes. These rings, when placed in the mold, under a simple vertical pressure would fill the cavity due to the pre-chosen dimensions of the rings to give the desired final shape.

Another method which may be exemplified is by flame spraying, also electrodeposition. Also porous ceramic shapes can be made by etching out of a part of a ceramic material itself made in the final shape. Thus also may be made porous metallic shapes. The familiar nickle-aluminum alloy, for example, may be attacked with caustic soda solution to dissolve the aluminum and to leave the porous mass of nickel which will then be impregnated with the cooling agent. Still other mechanical devices for utilizing such techniques of conveniently making the porous-solid mass preparatory to impregnation with the coolant are within the scope of this invention.

Still other porous mesh structures may be made from non-metallic materials, i.e. quartz fibers, graphite fibers, glass fibers and other similar materials. These are then impregnated with coolant.

We have also found that plastic reinforced laminates and other more or less porous plastics, as foams with continuous cells can be utilized with proper selection of materials. It is usually desirable to reinforce the plastic, utilizing fibers of glass, of quartz, ceramic particles, metal mesh, etc. There may be indicated yet another embodiment as exemplary but not limiting:

*Example V*

An epoxy laminate reinforced with graphite fibers is made using 100 parts by weight of Epon 828 resin (Shell Chemical Co., manufacturer), 15 parts meta-phenylene diamine as curing agent, and 10 parts trichlor ethylene as a diluent. This mixture is poured into a mold which is filled with plies of fiber cloth, or the plies of fiber cloth may be added alternately to layers of the resin mix in the mold. The mold is in the shape of a cylindrical tube 5 inches outside diameter and 4 inches inside diameter. The graphite fiber cloth has been stamped into rings of the same inner and outer diameter as the mold and as the reinforcing rings of fiber cloth. The molding operation is carried out in such a manner that the resin is gelled before removal of the diluent; the diluent is then thoroughly removed by evaporation to give a porous structure. This porous structure is then impregnated with lithium.

It is apparent to those skilled in the art that there are many variations of our invention which will be covered by the following claims, and only a few of the variations in the several steps of manufacture and the many materials for both the porous structure and the coolant have been described or exemplified above. Thus, there may be used two or more materials as coolants, in the same impregnating operation, either mixed or so applied that the one with the higher cooling effect or lower effective cooling temperature is added in that part of the finished shape wherein these properties are most effective. Also two or more types of porous mass or materials thereof may be simultaneously used. Furthermore, different methods of impregnating may be used such as centrifugal casting, also solvent impregnation, boiling and condensation of the coolant material into the interstices, also any system of casting of the metal which would involve giving a foam with continuous cells with pores to be filled. Furthermore, the use of an organic or inorganic material for the porous mass which, after being filled with the coolant material and in use, tends to melt and foam or burn to cause an insulating barrier aided in its formation by the gases released from the coolant material.

Still further mechanical effects may be secured by directing the gases formed by the vaporization or sublimation of the coolant material in some direction rather than perpendicular to the heated surface. This might be by means of channels formed or cut into the solid shape, either during the manufacturing process or during the time of use by the action of the heat or other effects on the device. In those cases where the gases may, by their expansion, due to the vaporization, combustion, dissociation or otherwise cause an additional thrust effect, such release of gases may be provisioned to take full advantage thereof rather than exhausting at the nearest surface. Still other means of producing the fibers or threads which then may be compressed could be by utilizing metallic turnings or from other machining operations which, because of their rough surfaces tend to interlock and give a stronger final part.

Yet again, the heat treatment of the porous mass for any one of several purposes during the forming either prior to or after the impregnation may allow improvement of metallic structures of particular alloys, the adhesiveness, the reduction of strains due to pressing operations, etc.

Having thus described the subject matter of our invention, what is desired to secure by Letters Patent is:

1. An article for use in contact with a high-velocity gas stream at least a surface portion thereof exposed for contact with such stream comprising a porous mass of metallic material the pores of which statically retain at least one heat-absorbing material capable of being converted to the vapor state by conditions of temperature and pressure resulting from contact of the article by such gas stream, heat absorption resulting from such conversion to the vapor state being effective to minimize harmful ablation of the surface of the article subjected to such gas stream.

2. An article in accordance with claim 1, wherein said heat-absorbing material is a member selected from the group consisting of lithium, lithium hydride, beryllium, beryllium hydride, magnesium, magnesium hydride, calcium, calcium hydride and boron.

3. An article in accordance with claim 1, wherein the voids of said porous mass constitute 10–80% of the volume of said mass.

4. An article for use in contact with a high velocity gas stream and characterized by high resistance to harmful ablation and thermal shock, at least a surface portion thereof exposed for contact with such gas stream comprising a porous mas made up of interengaged metallic filaments, the pores of which statically retain a substantial proportion of at least one heat-absorbing material capable of being converted to the vapor state by conditions of temperature and pressure resulting from contact of the exposed surface of the article by such gas stream.

5. As a new article of manufacture, a reaction propulsion nozzle at least the inner surface of which is constituted by a porous metallic mass, the pores of said mass constituting 10–80% of the volume thereof, said pores statically retaining an effective amount of at least one coolant material capable of converting to the vapor state at the temperatures to which said surface is subjected as, during use of the nozzle propulsion gases pass through the nozzle, heat absorption resulting from such conversion to the vapor state being effective to minimize harmful ablation of said surface by such gases.

6. As a new article of manufacture, a reaction propulsion nozzle having a high resistance to harmful ablation and thermal shock, said nozzle comprising an inner surface portion constituted by a porous metallic mass having a molded body of interengaged metallic filaments, said pores constituting 50–80% of the volume of said body and being at least predominantly filled with a material solid at ambient temperatures selected from the group consisting of lithium, lithium hydride, beryllium, beryllium hydride, magnesium, magnesium hydride, calcium, calcium hydride and boron, said material being convertible to the vapor state at the temperatures to which said surface portion is subjected as, during use of the nozzle propulsion gases pass through the nozzle.

References Cited in the file of this patent
UNITED STATES PATENTS

| | | |
|---|---|---|
| 2,206,057 | Skinner | July 2, 1940 |
| 2,354,151 | Skoglund | July 18, 1944 |
| 2,447,200 | Miller | Aug. 17, 1948 |
| 2,457,051 | Le Clair | Dec. 21, 1948 |
| 2,614,947 | Heyroth | Oct. 21, 1952 |
| 2,679,090 | Farr | May 25, 1954 |
| 2,835,107 | Ward | May 20, 1958 |
| 2,849,860 | Lowe | Sept. 2, 1958 |
| 2,992,960 | Leeg et al. | July 18, 1961 |
| 3,014,353 | Scully et al. | Dec. 26, 1961 |
| 3,022,190 | Feldman | Feb. 20, 1962 |
| 3,026,806 | Runton et al. | Mar. 27, 1962 |

FOREIGN PATENTS

| | | |
|---|---|---|
| 1,003,758 | France | Nov. 21, 1951 |
| 483,406 | Great Britain | Apr. 20, 1938 |
| 205,570 | Switzerland | Sept. 16, 1939 |